(12) United States Patent
Hooper

(10) Patent No.: US 7,953,899 B1
(45) Date of Patent: May 31, 2011

(54) UNIVERSAL DIAGNOSTIC HARDWARE SPACE ACCESS SYSTEM FOR FIRMWARE

(75) Inventor: Christopher D. Hooper, Fremont, CA (US)

(73) Assignee: 3PAR Inc., Fremont, CA (US)

( * ) Notice: Subject to any disclaimer, the term of this patent is extended or adjusted under 35 U.S.C. 154(b) by 1098 days.

(21) Appl. No.: 10/227,077

(22) Filed: Aug. 21, 2002

(51) Int. Cl.
*G06F 13/38* (2006.01)

(52) U.S. Cl. .................. 710/5; 710/63; 710/64

(58) Field of Classification Search ............. 710/5, 10, 710/11, 63, 64
See application file for complete search history.

(56) References Cited

U.S. PATENT DOCUMENTS

| | | | |
|---|---|---|---|
| 6,349,352 B1 * | 2/2002 | Lea | 710/72 |
| 6,389,129 B1 * | 5/2002 | Cowan | 379/221.03 |
| 6,546,450 B1 * | 4/2003 | Liu | 710/316 |
| 6,697,895 B1 * | 2/2004 | Sherritt et al. | 710/74 |
| 6,701,405 B1 * | 3/2004 | Adusumilli et al. | 710/308 |
| 6,738,856 B1 * | 5/2004 | Milley et al. | 710/315 |
| 6,754,811 B1 * | 6/2004 | Cato et al. | 712/227 |
| 6,795,873 B1 * | 9/2004 | Barth et al. | 710/15 |
| 6,886,171 B2 * | 4/2005 | MacLeod | 719/324 |
| 7,082,598 B1 * | 7/2006 | Le et al. | 717/127 |
| 7,100,169 B2 * | 8/2006 | Carney et al. | 719/321 |
| 7,209,980 B2 * | 4/2007 | Wugofski et al. | 710/5 |
| 7,304,758 B2 * | 12/2007 | Ferlitsch | 358/1.15 |
| 7,536,699 B2 * | 5/2009 | Sadovsky et al. | 719/322 |
| 2002/0194497 A1 * | 12/2002 | McGuire | 713/201 |
| 2003/0051044 A1 * | 3/2003 | Parry et al. | 709/231 |
| 2003/0093598 A1 * | 5/2003 | Park | 710/63 |
| 2003/0105854 A1 * | 6/2003 | Thorsteinsson et al. | 709/223 |
| 2003/0217254 A1 * | 11/2003 | Page et al. | 713/2 |
| 2004/0039459 A1 * | 2/2004 | Daugherty et al. | 700/39 |
| 2004/0225775 A1 * | 11/2004 | Pellegrino et al. | 710/200 |

* cited by examiner

*Primary Examiner* — Chun-Kuan Lee
*Assistant Examiner* — Ernest Unelus

(57) ABSTRACT

Numerous types of hardware devices and memory included in a computing system can be accessed with a universal interface that has common interface commands. The universal interface aids engineers and technicians working on the system. This is particularly useful in a data storage system that includes a plurality of nodes for providing access to a data storage facility.

14 Claims, 8 Drawing Sheets

UNIVERSAL DIAGNOSTIC HARDWARE SPACE ACCESS SYSTEM FOR FIRMWARE

CROSS REFERENCE TO RELATED APPLICATIONS

This application is related to U.S. patent application Ser. No. 09/633,088 entitled "Data Storage System," and to U.S. patent application Ser. No. 09/751,649 entitled "Communication Link Protocol Optimized For Storage Architectures," which are hereby incorporated by this reference in their entirety.

BACKGROUND OF THE INVENTION

1. Field of the Invention

The present invention relates generally to the field of computing devices and firmware and, more particularly, to simplified access of the computing devices and firmware of the devices.

2. Related Art

In the context of computer systems, enterprise storage architectures provide mass electronic storage of large amounts of data and information. The frenetic pace of technological advances in computing and networking infrastructure—combined with the rapid, large-scale sociological changes in the way these technologies are used—has driven the transformation of enterprise storage architectures faster than perhaps any other aspect of computer systems. This has resulted in a variety of different storage architectures, such as, for example, direct attached JBODs (Just a Bunch Of Disks), SAN (Storage Area Network) attached JBODs, host adapter RAID (Redundant Array of Inexpensive/Independent Disks) controllers, external RAID controllers, redundant external RAID controllers, and NAS (Network Attached Storage). Each of these storage architectures may serve a special niche, and thus may differ significantly in terms of functionality, performance, cost, availability, scalability and manageability.

Typically, any given business has a variety of data storage needs, such as, for example, database storage, home directories, shared application executables, and data warehouse storage. In general, no single one of the previously developed architectures is capable of addressing all of the storage needs of a business. Thus, businesses are forced to use a number of different architectures to provide the functionality and performance which are desired. This results in fragmented data storage which limits the sharing of data resources, erects static boundaries in data, necessitates redundant training for staff, and requires additional management resources. For example, excess storage space in one type of architecture generally cannot be used to ease congestion in an architecture of another type. Nor can storage architectures of different types be used as backup/redundancy for each other.

Furthermore, in more complex data storage systems, many different kinds of memory devices and storage facilities are used. These may include, for example, integrated circuit memory of varying types (e.g., dynamic random access memory (DRAM), static random access memory (SRAM), synchronous DRAM, read only memory (ROM), electrically programmable ROM (EPROM), etc.) and mass storage devices (e.g., magnetic disk drives, optical disk drives, tape storage, etc.). Furthermore, even for a given type of device, the devices can be from different manufacturers or brands. Each type and brand of device may have its own respective set of instructions, routines, and commands for handling data and information. In order to maintain the complex data storage system, the devices that make up the storage system need to periodically be accessed for troubleshooting, maintenance and updating. Each of the various pieces of hardware will generally have different firmware controlling the hardware, and the firmware must be utilized in order to access the device. Because of all the different types of storage devices and brands for each type, however, it can be very hard to keep track of or remember all of the different access commands and routines for each possible piece of the system. This can make the maintenance, upkeep, and troubleshooting of a complex data storage system very burdensome and difficult.

SUMMARY OF THE INVENTION

In a computer system, and in particular a mass data storage system with many different types of memory storage devices, a simple interface is provided to aid developers, engineers, technicians and the like. Instead of having to memorize or continually reference the commands, command formats and syntax of all the different memory storage devices that make up the data storage system, a user interface having a limited number of simple commands is provided. The interface seamlessly takes the commands entered by the user and translates them into the specialized format required by whatever memory device is selected. Thus, the user is relieved of having to familiarize himself with the intricacies of a myriad of different devices.

One embodiment of the invention is a mass storage device comprising a plurality of memory storage devices of different types, each type of memory storage device having a particular access method. The mass storage device has firmware distributed amongst the plurality of memory storage devices, and an interface configured to modify the firmware that has a set of universal commands that are translated into the particular access methods required to modify the firmware in each type of memory storage device.

Another embodiment of the invention includes a method of accessing memory storage devices in a mass storage system comprising different types of memory storage devices each having specific command structures. The method comprises receiving a generic command from a user to access a selected memory storage device of the mass storage system, correlating the generic command received from the user with the command structure of the selected memory storage device of the mass storage system, and transmitting a command formatted in the command structure of the selected memory storage device to the selected memory storage device.

Other aspects and advantages of the present invention will become apparent from the following descriptions and accompanying drawings.

BRIEF DESCRIPTION OF THE FIGURES

For a more complete understanding of the present invention and for further features and advantages, reference is now made to the following description taken in conjunction with the accompanying drawings, in which.

DETAILED DESCRIPTION

The system and method of device abstraction of the present invention can work with any networked memory components.

Figure 1A:
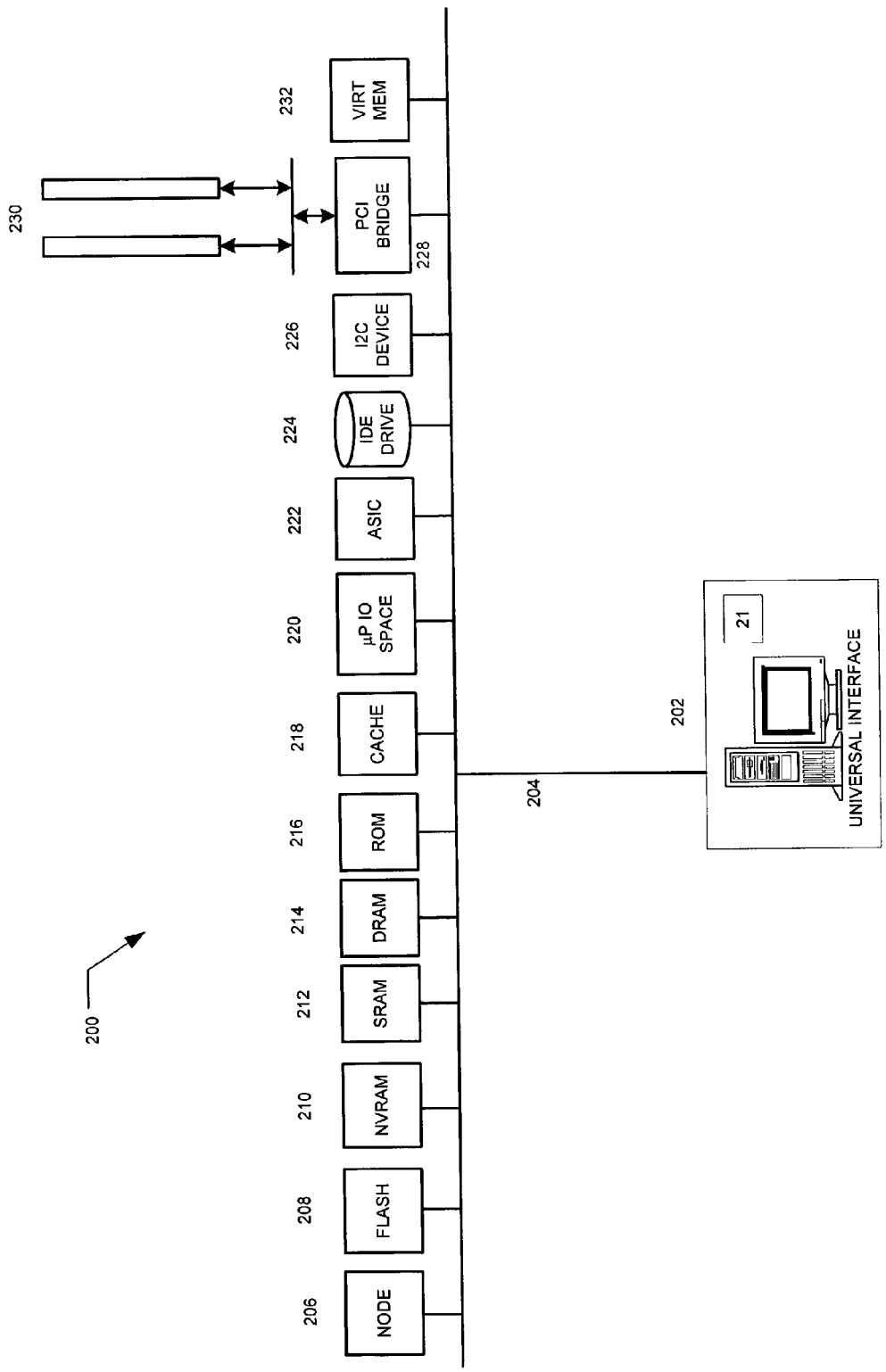
FIG. 1A illustrates a generic embodiment of the present invention.

FIG. 1A illustrates a typical computing system 200 in which embodiments of the present invention may operate. System 200 may have any number of components, some of which are illustrated in FIG. 1A. Universal interface 202 (also referred to as "user interface") is shown as being implemented on a personal computer or workstation. The interface may, however, be implemented in any microprocessor controlled "smart" device with a display and input such as a PDA. Universal interface 202 can be supported by interface component 21, which may comprise hardware and/or software. As shown, interface component 21 may run on the smart device enabling a user to access a wide variety of the components of system 200. It should be understood, however, that in other embodiments, interface component 21 can reside or be implemented in other parts of system 200. Generally speaking, universal interface 202 and interface component 21 greatly simplify access to the variety of components of system 200 by providing a standard or universal set of commands and structures for different components that each have their own commands and command structures or syntax. Universal interface 202 is connected to the components via network 204. As used herein, the terms "connected" or "coupled" mean any connection or coupling, either direct or indirect, between two or more elements; such connection or coupling can be physical or logical. Network 204 connects the universal interface 202 to the other components 206-232, and may include one or more internal buses, integrated circuitry, cabling to and from IO ports, and any other type of network connections such as local or wide area network, including even the internet. Thus, access to components 206-232 may be at a local or remote access point.

Components 206-232 include node 206 and all the of the devices within the node. Node 206 will be described in further detail with regard to the environment for a data storage system described below, as will the functionality of interface component 21 and universal interface 202. System 200 components may also include: flash memory 208; non-volatile random access memory (NVRAM) 210; static random access memory (SRAM) 212; dynamic random access memory (DRAM) 214; read only memory (ROM) 216; cache memory 218; microprocessor IO space 220; application specific integrated circuit (ASIC) 222; IDE drive 224, I²C device 226; personal computer interface (PCI) bridge 228 and associated slots 230 and devices within slots 230; and virtual memory 232. Other components or areas that may be accessed are board level registers or memory.

One such network that the universal interface will work with is described in order to provide the reader with an illustration of an environment for a data storage system where the invention would be particularly advantageous. It should, however, be understood that the invention is not limited to the particular environment and storage system described, but is widely applicable in many diverse environments.

Environment for a Data Storage System

Figure 1B:
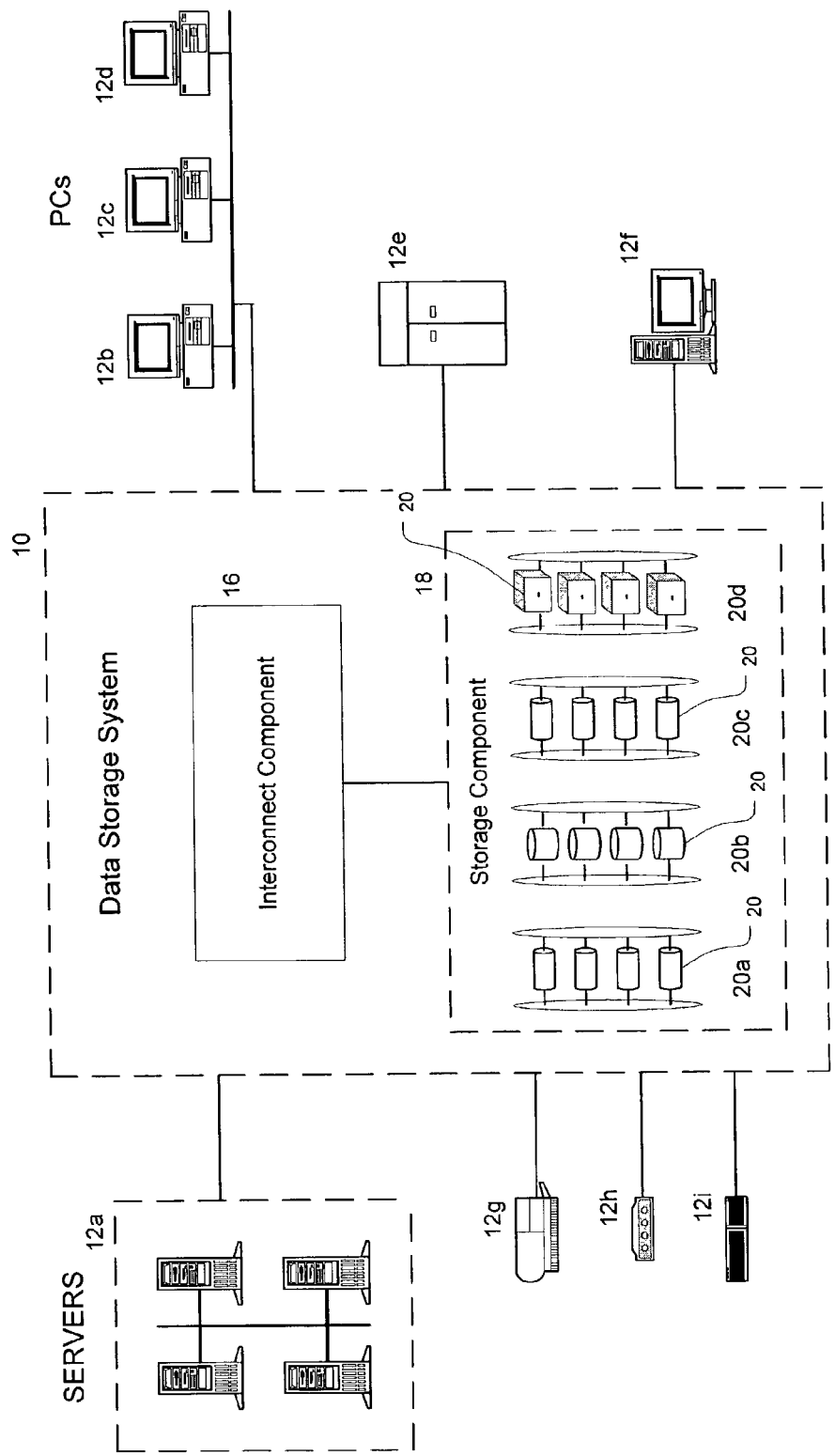
FIG. 1B illustrates a data storage environment in which embodiments of the present invention may operate.

FIG. 1B illustrates a data storage environment in which embodiments of the present invention may operate. As mentioned previously, the present invention may work in any computing environment or platform, and the data storage environment is only used to illustrate operation of the invention in one illustrative environment. In this environment, a data storage system 10 functions to provide mass storage for data and information routed, generated, manipulated, processed, or otherwise operated upon, by various host devices 12.

As depicted, these host devices 12 can include various processing devices, such as, for example, a server cluster 12a, one or more personal computers 12b, 12c, and 12d, a mainframe 12e, and a server tower 12f. Host devices 12 may also include various peripheral devices, such as, for example, a printer 12g, a modem 12h, and a router 12i. Each of these host devices 12 is connected to data storage system 10.

Data storage system 10 includes an interconnect component 16 and a storage component 18. Interconnect component 16 generally allows host devices 12 to store and retrieve information from storage component 18. In one embodiment, interconnect component 16 is a modular architecture that is readily scaled from one up to many storage access nodes. Interconnect component 16 may include a number of memory storage devices, which can be of different types. For example, these memory storage devices can be SDRAM, SRAM, NVRAM, EEPROM, PROM, EPROM, etc.

Storage component 18 provides mass storage for data and information. Storage component 18 can be implemented with any suitable mass storage resource, such as tape or disk storage. In one embodiment, as shown, storage component 18 includes a number of storage devices 20. Storage devices 20 may be of different types and/or brands. For example, storage devices 20 can be magnetic disk drives, magnetic tape, optical disk drives, or other bulk memory storage devices.

In some embodiments, one or more storage devices 20 may be combined as a JBOD (Just a Bunch of Disks) facility comprising a plurality of disk drives. The disk drives can be mounted in a rack-mountable storage shelf having one or more hot-pluggable disk drive sleds. Each sled may accommodate four disk drives on a pair of fibre channel (FC) connections. The sleds can be configured in one of two possible ways: (1) all sleds on the same redundant FC connections, or (2) half of the sleds on one set of redundant FC connections and the other half of the sleds on another set of redundant FC connections.

An interface component 21 is provided in data storage system 10, according to embodiments of the present invention. Interface component 21 generally functions to provide an interface for access to the various and different types of memory which may be part of data storage system 10 as described herein, or may be part of any computing device or platform. As shown, interface component 21 can be implemented as part of the hardware/software of interconnect component 16, but it should be understood that in other embodiments, interface component 21 can reside or be implemented in other parts of data storage system 10 or even hardware/software external to data storage system 10, such as, for example, one of the host devices 12. Interface component 21 supports a set of constructions, commands, protocols, or routines that are universally applicable for accessing any of the various types and brands of memory that are part of data storage system 10.

As further described herein, data storage system 10 implements or incorporates a scalable architecture particularly well suited for communication-intensive, highly available data storage, processing, or routing. This architecture may be used for a number of applications and can provide a high performance, highly available, scalable, flexible, and cost-effective storage array.

With the scalable architecture of data storage system 10, users (e.g., businesses) may begin with small configurations of data storage initially and later, when necessary, may expand to extremely large configurations. This expansion can be done without bringing down data storage system 10, changing system architectures, or drastically altering the basic infrastructure of the computing environment supported by data storage system 10.

Because of its flexibility and expandability, data storage system 10 can be used to consolidate the diverse storage requirements of a business. This eradicates static boundaries in data, thus enabling data resources to be readily shared and efficiently utilized. Furthermore, this eliminates or substantially reduces the inefficiency associated with training staff and management resources in the use and management of a multitude of data storage architectures.

Interconnect Component

Figure 2:
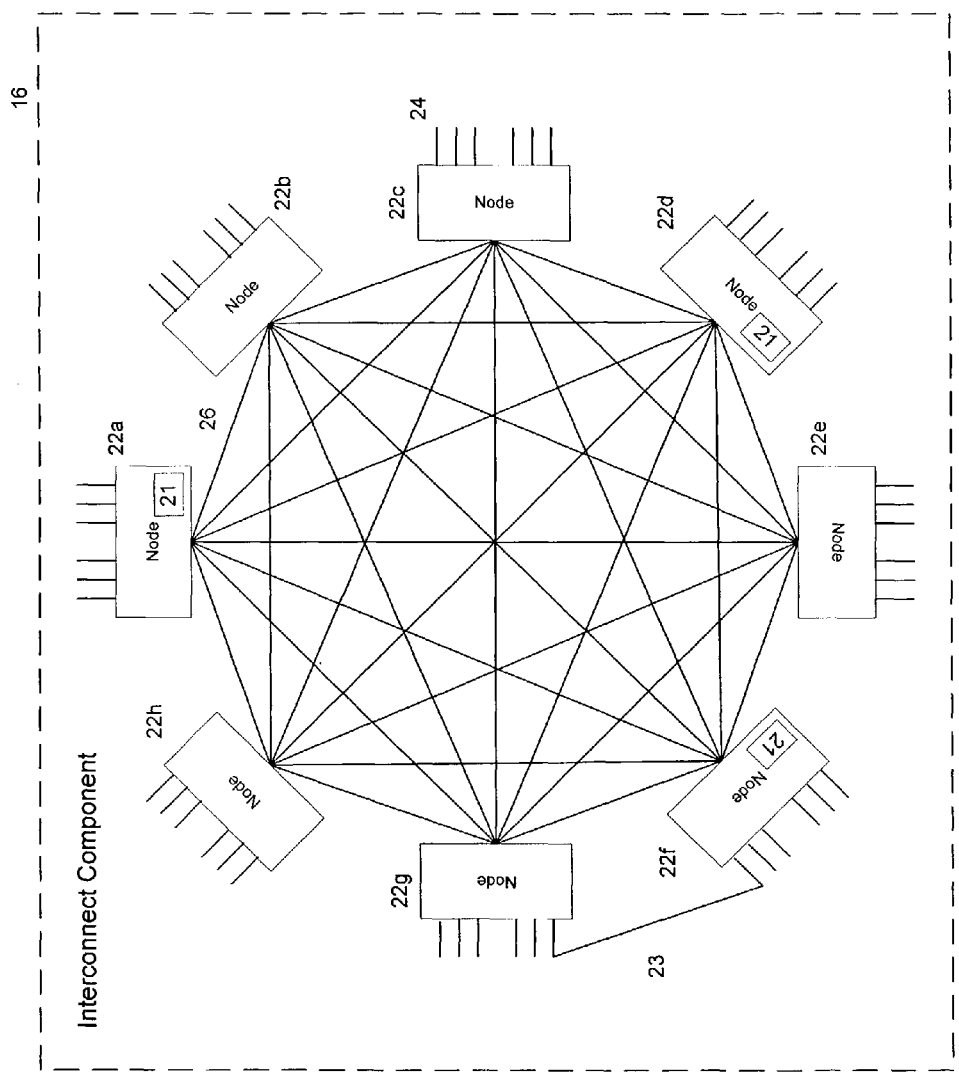
FIG. 2 is a block diagram for an interconnect component.

FIG. 2 is a block diagram for interconnect component 16, according to an embodiment of the present invention. Interconnect component 16 may include a number of processing nodes 22 connected together by communication paths 26.

As depicted, nodes 22 are separately labeled as 22a, 22b, 22c, 22d, 22e, 22f, 22g, and 22h. Each node 22 generally functions as a point of interface/access for one or more host devices 12 and storage devices 20 (FIG. 1). For this purpose, in one embodiment, each node 22 may include one or more peripheral component interconnect (PCI) slots, each of which supports a respective connection 24. Each connection 24 can connect a host device 12 or a storage device 20. Connections 24 can be small computer system interface (SCSI), fibre channel (FC), fibre channel arbitrated loop (FCAL), Ethernet, Infiniband, or any other suitable connection. According to some embodiments, an interface component 21 may be implemented or reside at one or more nodes 22 for facilitating the access to the various storage devices within storage the components as well as the various memory components/devices within the interconnect component 16 which can make up data storage system 10.

In one embodiment, each host device 12 and storage device 20 has two separate connections 24 to interconnect component 16. In each such pair of connections 24, one connection 24 couples the respective host/storage device to one node 22 and the other connection 24 couples the respective host/storage device to another node 22. One of these two nodes 22 is designated as the "primary node" for the host/storage device, while the other node 22 is designated as the "secondary node." In normal operation, in one embodiment, the primary node performs all accesses to the respective host/storage device; the secondary node takes over only if the primary node fails. In an alternative embodiment, the primary node and the secondary node are simultaneously active to perform accesses. Both embodiments provide redundancy and fault tolerance so that the failure of any particular node 22 does not result in loss of connection to the host devices 12 and storage devices 20 connected to that node 22.

Each node 22 may include its own separate cluster memory (not expressly shown in FIG. 2). Each cluster memory buffers the data and information which is transferred through the respective node 22. Each cluster memory can also serve to buffer the data/information transferred through one or more other nodes 22, as described below in more detail. Thus, taken together, cluster memory in the nodes 22 is used as a cache for reads and writes into storage component 18. Cluster memory can be implemented as any suitable cache memory, for example, synchronous dynamic random access memory (SDRAM).

Communication paths 26 (only one of which is labeled for clarity) connect nodes 22 together. As shown, communication paths 26 connect any given node 22 with every other node 22 of interconnect component 16. That is, for any given two nodes 22, a separate communication path 26 is provided. Each communication path 26 may be implemented as a high-speed, bi-directional link having high bandwidth to provide rapid transfer of data and information between nodes 22. Control of data/information transfers over each communication path 26 is shared between the two respective nodes 22.

Communication paths 26 provide a low latency communication channel between nodes 22 without the protocol overhead of transmission control protocol/internet protocol (TCP/IP) or Fibre Channel protocol. In one embodiment, transfers of data/information over communication paths 26 are covered by an error-correcting code (ECC) that can cover a single bit error in any 64-bit word and can detect any line error on the communication paths 26. Since control of data/information transfers on communications paths 26 is distributed among nodes 22, there is no single point of failure in interconnect component 16 which would cause the component to completely fail.

In addition to communication paths 26, each node 22 may be connected to every other node 22 with a separate link 23. For clarity, only one link 23 is shown. These links 23 can be slower speed connections relative to communication paths 26. In one embodiment, each link 23 can be a serial connection supported by the PCI slots of the respective nodes 22. Each slower-speed link 23 provides or supports a "heartbeat" connection between the two respective nodes 22. As further described herein, such "heartbeat" connection allows each of the two respective nodes 22 to query the other node in order to determine if the other node has failed.

The configuration for interconnect component 16 described herein provides a distributed cluster memory for mass storage. That is, data written into or read out of storage component 18 can be transferred across communication paths 26 and stored at the cluster memory of multiple nodes 22. For writes into storage component 18, data may be temporarily written into the cluster memory of one node 22 and also "mirrored" in the cluster memory of another node 22. That is, the relevant data is automatically sent and replicated in the cluster memory of the other node 22. In one embodiment, cache writes at one node 22 can be copied in every other node 22 of interconnect component 16. This provides multiple copies of the data to be written so that the data is backed up. The writes into multiple cluster memories can occur virtually simultaneously with communication paths 26. This provides significant fault tolerance and redundancy so that data is not lost in the event that one node 22 fails. In addition, for write caching, because data is mirrored on another node 22 as it comes in from a host device 12, an acknowledgement of the write can be returned relatively quickly. This reduces the latency of critical write operations. Furthermore, the large capacity for read caching can significantly improve the hit rate for reads, thereby reducing the effective latency and required bandwidth for reads.

The distributed cluster memory is shared and protected. The distributed cluster memory is shared because, in one embodiment, a respective controller in any node 22 of interconnect component 16 can write into the cluster memory at any other node 22. The cluster memory at any given node 22 is protected from unexpected accesses from other nodes 22 so that hardware or software failures on a remote node do not significantly affect the local node. Distributed cluster memory also allows for scalability in terms of size as well as performance.

In one embodiment for interconnect component 16, each node 22 can be implemented as a system board on which are provided suitable central processing unit (CPU) devices, memory devices, and application specific integrated circuit (ASIC) devices for providing the functionality described herein. Each node has memory containing firmware. These system boards can be connected together on a backplane which supports communication paths 26. Such an embodiment is shown and described below with reference to FIG. 3.

Node

Figure 3:
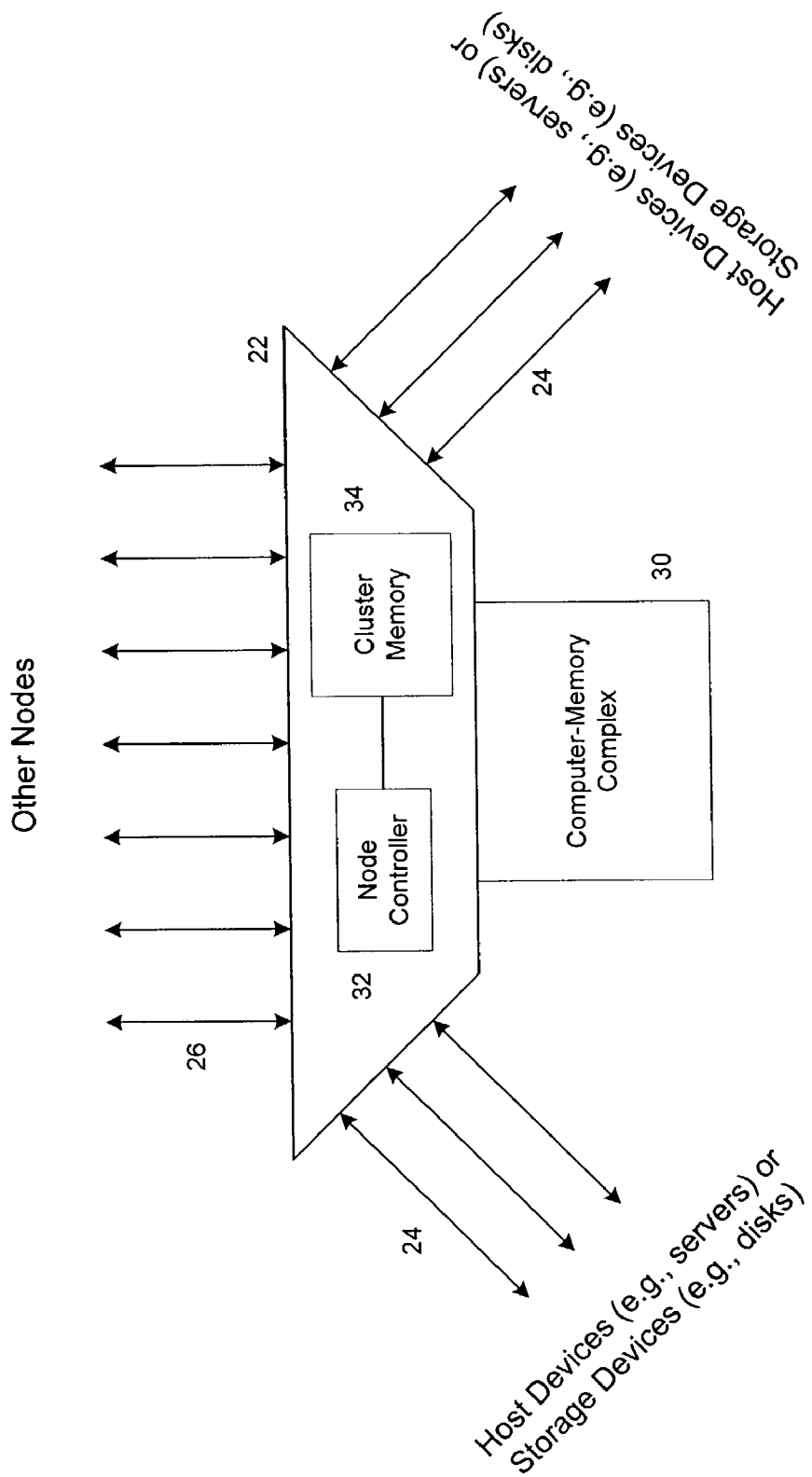
FIG. 3 is a simplified block diagram for a node.

FIG. 3 is a block diagram of a node 22. Node 22 supports connections 24 for connecting host devices 12 and storage devices 20, and communication paths 26 for communicating with other nodes 22. As depicted, node 22 can be implemented with a computer-memory complex 30, a node controller 32, and a cluster memory 34.

Computer-memory complex 30 can be a computer system which includes one or more central processing units (CPUs) and associated memory running an independent copy of an operating system. Computer-memory complex 30 functions to support, control, or otherwise manage one or more suitable buses through which data and information can be transferred via connections 24. In one embodiment, each such bus can be a peripheral component interconnect (PCI) bus. Computer-memory complex 30 may also support other functions, such as, for example, a hypertext transport protocol (HTTP) service, a network file system (NFS) service, and a common Internet file system (CIFS) service. An embodiment of computer-memory complex 30 is described below in more detail.

Node controller 32 and cluster memory 34 are distinct and separate from computer-memory complex 30. Node controller 32 may cooperate with computer-memory complex 30 but, to some degree, operates independently of the same. That is, computer-memory complex 30 may program node controller 32. Node controller 32, as programmed, can then operate independently on data, thereby providing overall control for the transfer of data through node 22. Accordingly, computer-memory complex 30 is not burdened with the task of performing actual operations on the data. Cluster memory 34 is coupled to node controller 32 and, as described herein, generally functions to cache data and information being transferred through node 22. With cluster memory 34, data/information being transferred through node 22 does not have to be temporarily stored in computer-memory complex 30. Thus, by reducing the workload and responsibilities of computer-memory complex 30, node controller 32 and cluster memory 34 facilitate and optimize the transfer of data and information through node 22.

In one embodiment, transfers of data/information can occur directly between the cluster memories 34 on two nodes 22. The high bandwidth of communication paths 26 allows very efficient communication between nodes 22. Furthermore, these direct transfers between any two given nodes 22 can be under the control of one or both of the respective node controllers 32. Thus, such direct transfers do not consume any PCI bandwidth or CPU/memory bandwidth of any computer-memory complex 30.

This ability to let bulk data transfer bypass the general purpose computer-memory complex 30 is advantageous. It enables the transfer of data/information at tremendous bandwidth. Furthermore, because the computer-memory complex 30 complex is less loaded, it is more available to provide or support other functions, such as, for example, a HTTP service, a NFS service, and a CIFS service.

Exemplary Implementation for a Node

Figure 4:
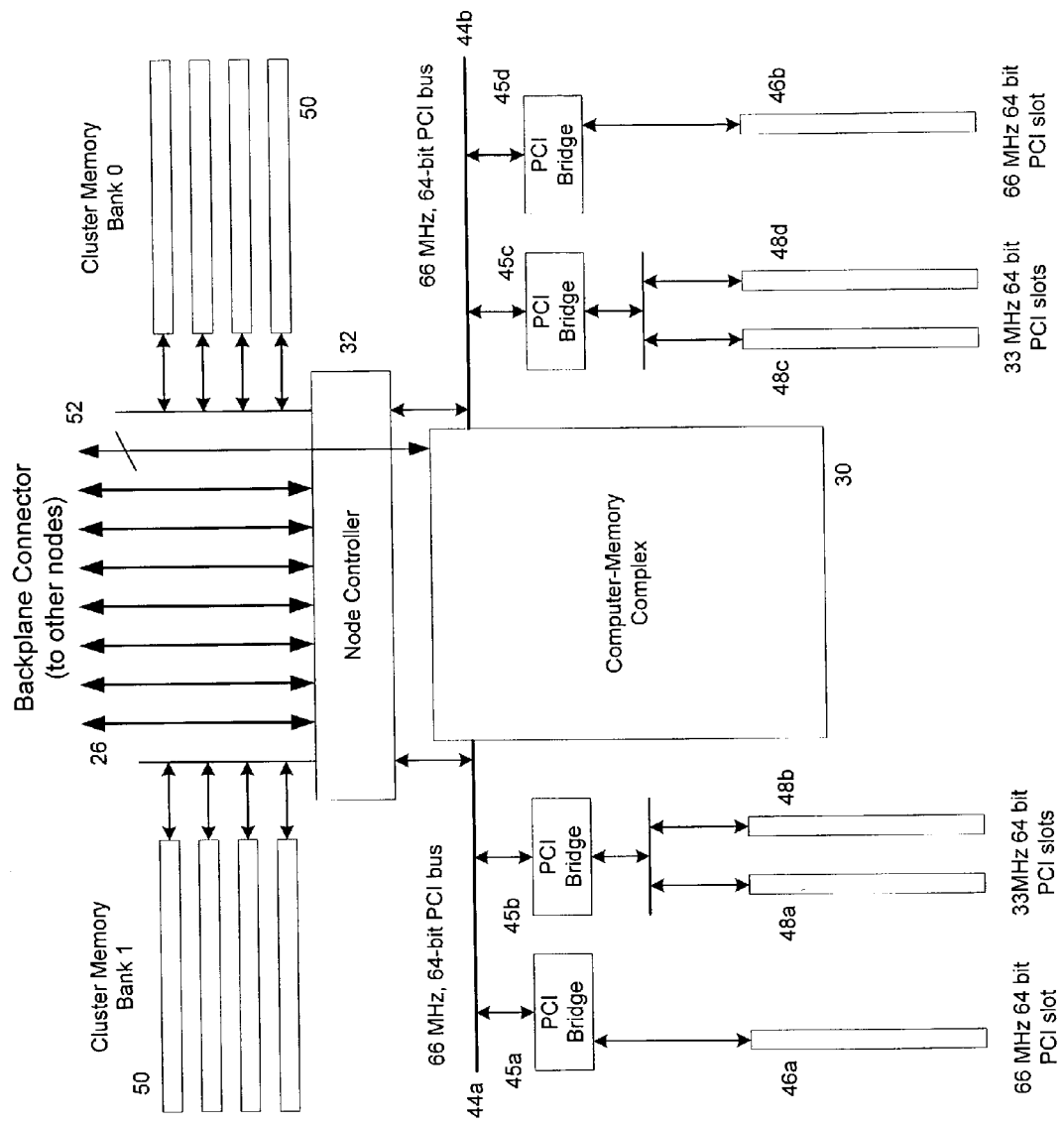
FIG. 4 illustrates an exemplary implementation for a node.

FIG. 4 illustrates an exemplary implementation for a node 22. Within this implementation, computer-memory complex 30 and node controller 32 may be implemented with one or more integrated circuit (IC) devices mounted on a suitable system board connected to other nodes 22 via a backplane.

As depicted, two peripheral component interconnect (PCI) buses 44 are supported by computer-memory complex 30. These PCI buses, which are separately labeled 44a and 44b, can each be a 66 MHz, 64-bit bus. A number of PCI bridges 45 are provided for each bus. As depicted, PCI bridges 45a and 45b are provided for PCI bus 44a, and PCI bridges 45c and 45d are provided for PCI bus 44b. PCI buses 44 and the respective PCI bridges 45 support one or more PCI slots to which a host device 12 or a storage device 20 can be connected. In this embodiment, each PCI bus 44 supports one 66 MHz, 64-bit PCI slot 46 and two 33 MHz, 64-bit PCI slots 48, although slots 48 are also capable of 66 MHz operation in certain configurations. Collectively, PCI buses 44, PCI bridges 45, and PCI slots 46 and 48 support or provide an implementation for connections 24 described with reference to FIGS. 2 and 3.

Node controller 32 resides on both PCI buses 44, and thus may transfer data/information to and from host devices 12 and storage devices 20 directly (i.e., without routing through computer-memory complex 30). One or more slots 50 connect node controller 32 to cluster memory. Although eight slots 50 are shown, for clarity only two of these slots 50 are labeled in FIG. 4. Each slot can hold a suitable memory device for implementing cluster memory.

Cluster memory may be implemented in banks which, as depicted, are separately labeled "Cluster Memory Bank 1" and "Cluster Memory Bank 0." In one embodiment, each bank may comprise a number of dual in-line memory modules (DIMMs), each DIMM held in a separate slot 50. Each DIMM can be a synchronous dynamic random access memory (SDRAM) of up to 1 GByte capacity. Thus, the total capacity for both banks of cluster memory in node 22 can be eight GBytes, and the total capacity for the cluster memory distributed in an interconnect component 16 having eight nodes is 64 GBytes.

The memory banks can be accessed with long bursts so that the sustainable bandwidth is close to the peak bandwidth. In one embodiment, each bank of cluster memory is eight bytes wide and operates at 133 MHz, thus resulting in a peak bandwidth of 1064 MBytes/s. The aggregate bandwidth of the two banks is approximately two GBytes/s.

Unlike the system memory in a general-purpose computer-memory complex, cluster memory is not limited to the bandwidth available on the system bus (e.g., a Pentium Pro bus). Rather, cluster memory can be accessed via multiple data paths that do not need to traverse the system bus. These data paths include the two PCI buses 44a and 44b, the communication paths 26, and internal XOR engine data paths. Since each 66 MHz, 64-bit PCI bus is capable of transferring about 500 MByte/s, the two PCI buses alone can contribute about 1 GByte/s of cluster memory bandwidth, which would exceed the achievable bandwidth on a system bus. Link transfers bring the cluster memory bandwidth even higher.

Computer-Memory Complex

Figure 5:
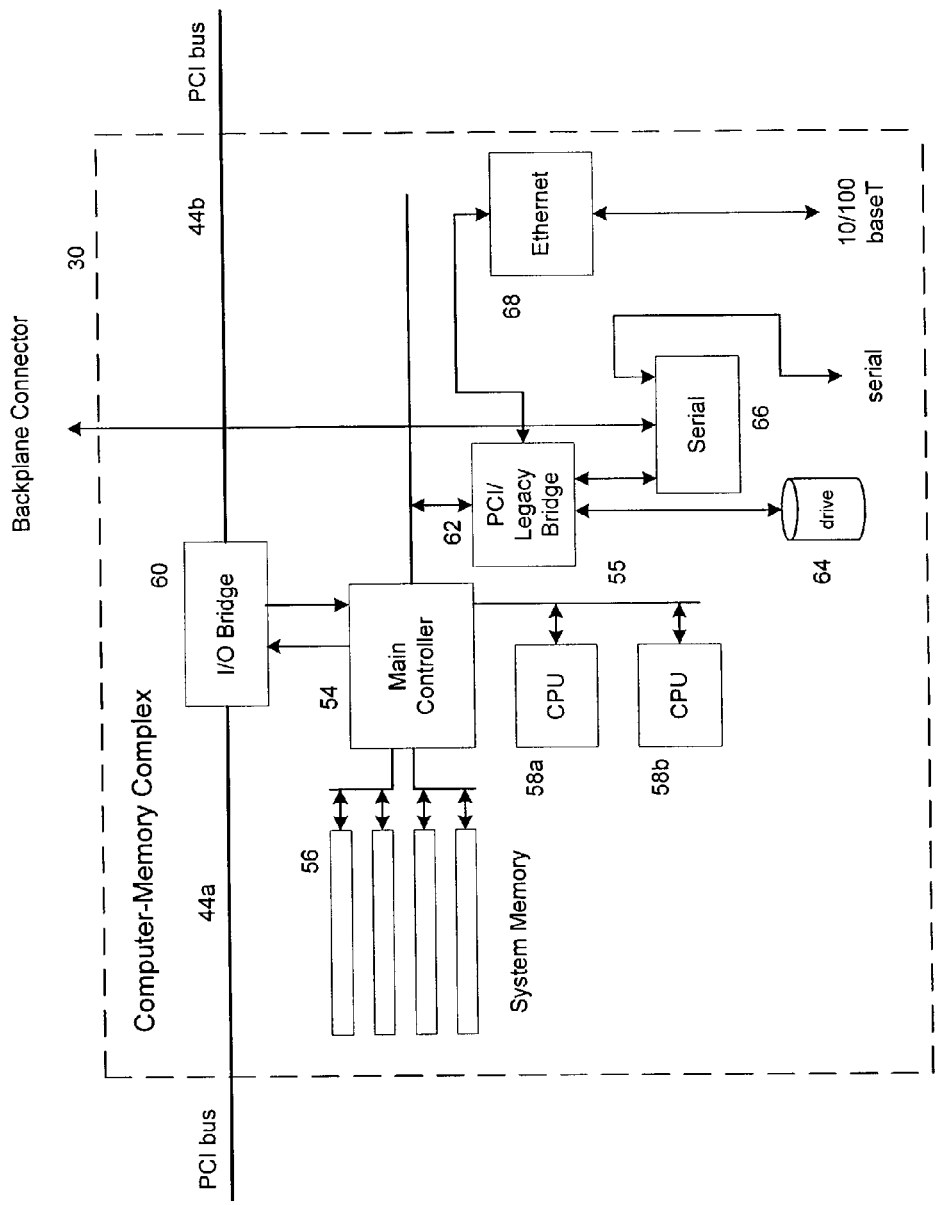
FIG. 5 illustrates an exemplary implementation for a computer-memory complex.

FIG. 5 illustrates an exemplary implementation for computer-memory complex 30. In general, computer-memory complex 30 can be implemented using a multi-processor capable chipset that provides a system memory controller, two PCI buses and a system bus for multiple processors. As shown, the chipset can include a main controller 54, an input/output (I/O) bridge 60, and a PCI/Legacy bridge 62. In one embodiment, main controller 54, I/O bridge 60, and PCI/Legacy bridge 62 can be implemented with a "Champion North Bridge," a "Champion Input/Output (I/O) Bridge (CIOB)," and a "Open South Bridge," respectively, all commercially available from ServerWorks. Other chipsets can also be used.

One or more central processing units (CPUs) 58, which are separately labeled 58a and 58b, generally provides processing capability for the control of data transfers through the node 22 on which computer-memory complex 30 is incorporated. Each CPU 58 can be implemented with any suitable processing device, such as, for example, a PENTIUM III or IV by Intel Corporation.

Main controller 54 is connected to CPUs 58 via a CPU bus 55. Main controller 54 coordinates and manages the overall operation of computer-memory complex 30. Main controller 54 functions as a bridge between a CPU bus 55 and a bus for system memory.

One or more slots 56 connect main controller 54 to system memory. For clarity, only one slot 56 is labeled. Each slot 56 may hold a suitable memory device for implementing system memory. System memory can be implemented, for example, with synchronous dynamic random access memory (SDRAM). System memory generally functions to store data and information used in controlling transfers for the respective node 22. System memory is not required to cache data for bulk transfers through node 22 as this function can be performed by cluster memory 34 at the node.

I/O bridge 60, coupled to main controller 54, supports PCI buses 44, which are, separately labeled 44a and 44b. In particular, I/O bridge 60 controls traffic of each PCI bus 44. I/O bridge 60 functions as a bridge between PCI buses 44 and main controller 54. Data transferred through the respective node 22 can be carried on PCI buses 44.

PCI/Legacy bridge 62 is coupled to main controller 54. PCI/Legacy bridge 62 generally functions as a bridge between PCI and industry standard architecture (ISA), integrated drive electronics (IDE), and other "legacy" interfaces on a PC platform. A local drive 64 is connected to PCI/Legacy bridge 62. Drive 64 can be used to boot the local operating system for computer-memory complex 30 and to back up local data from system memory in the event of a power failure.

A serial port 66 is connected to RCC south bridge 62. Serial port 66 generally functions to support a serial connection to and from computer-memory complex 30. This serial connection can be used as a secondary path between the respective node 22 and another node. The serial connection, which can be a slower-speed connection than a communication path 26, may function as a "heartbeat" connection between the two nodes 22.

In one embodiment, a separate serial port 66 is provided for every other node 22 in interconnect component 16. Thus, for an interconnect component 16 having eight nodes 22, the computer-memory complex 30 at any given node 22 may have seven serial ports 66 to provide a second path to each of the other seven nodes. The serial connections from a node 22 can be routed through a backplane to the other nodes. In addition to the separate serial ports 66 supporting connections with other nodes, one other serial port 66 can be provided for use as a diagnostic port into the respective node 22. This serial port 66 can be available through a panel connector. In one embodiment, each serial port 66 can be implemented as the same or separate suitable integrated circuit port device, such as, for example, an octal serial port chip. Serial port 66 may also contain memory storage and firmware.

The serial connections (provided by serial ports 66) and communication paths 26 provide redundant communication links between any two nodes 22. This redundancy addresses a problem generally known as a "split-brain" problem. The split-brain problem occurs in clustered systems in which a backup node is designed to take the place of a master node in the event that the master node fails. Typically, the master node and the backup node are joined by a single communication link. When this communication link is broken, the backup node infers (incorrectly) that the master node has failed and takes over the control functions of the master node. At the same time, the master node infers (incorrectly) that the backup node has failed and continues to perform the control functions. The dual operation of both the master node and the backup node performing the control functions can result in the corruption of data. Each communication link provided by serial ports 66 functions as "heartbeat" connection between two respective nodes 22. In the event that the communication path 26 between any two given nodes fails, the serial connection enables each of the two nodes 22 to check the "heartbeat" of the other node. That is, each node 22 is able query the other node in order to determine if the other node has failed. If the "heartbeat" connection indicates that a master node is still functioning properly, a backup node will not take over control functions. Thus, corruption of data due to the "split-brain" problem is avoided.

An Ethernet port 68, also coupled to main controller 54 via the PCI legacy bridge, supports an Ethernet connection with hardware external or remote to node 22. Ethernet port 68 can be implemented as a 10/100 Base-T Ethernet hub. In one embodiment, the Ethernet ports 68 of several nodes 22 can be connected to any given external hardware to provide redundancy in the management and control functions for that hardware. Accordingly, if one of these Ethernet ports 68 fails, the other Ethernet port 68 still provides management and control.

Accessing Various Memory Storage Devices of the Mass Data Storage System

As described above, data storage system 10 has numerous types and brands of memory storage devices. During the course of configuration, operation, maintenance and updating of data storage system 10, it may be necessary for an engineer or technician or other user ("user") to view and modify the contents of one or more of the memory storage devices. This becomes quite complicated because each of the memory storage device types may have different access routines and configurations. Furthermore, within a given device type, different manufacturers of the same device type may have different access routines and configurations.

A CPU, for instance the CPU in interconnect component 16 or CPUs 58a or 58b within computer memory complex 30, may include SDRAM and SRAM. CMOS memory in the CPU or in any other device of data storage system 10 will contain non-volatile random access memory (NVRAM) for storing information needed upon power up of a component. Node controller 32 may incorporate an application specific integrated circuit (ASIC) that controls operation of the node and also contains memory. Serial port 66 may also contain programmable read only memory (PROM) or NVRAM which a user may wish to access, as does Ethernet port 68. PCI controllers 70a and 70b and the PCI devices in the PCI slots connected via the PCI bus may also contain memory or device registers that is desirable to read and modify. Many of the random access memories included in data storage system 10 may also be flash type memory in various implementations of the system. Bulk memory storage devices, e.g., optical or magnetic IDE drives or tape storage, also contain data that is necessary to modify from time to time. Other items in the system are accessed via an I²C bus. An I²C-Bus is a simple 2-wire serial bus that allows micro-controllers and computers to connect to specialized integrated circuit components that are a part of data storage system 10 like temperature and voltage sensors, serial EEPROMs, memory DIMM identification circuits, board general purpose I/O devices, chipset debug interfaces, etc.

Additionally, as multiple nodes 22 and even multiple data storage systems 10 may be networked together via local networks or large area networks such as the Internet, the memory storage devices of networked (remote) nodes and data systems can also be accessed.

Firmware or a basic input output system (BIOS) may be stored on any and all of the memory components or storage devices. Generally speaking, the firmware controls the operation of the memory storage devices. Although it may be necessary and desirable to modify other data stored in the memory devices of data storage system 10, the memory or device registers are regularly viewed and updated by engineers and technicians.

According to embodiments of the present invention, a user interface 202 for the engineers and technicians is provided which simplifies access to all of the various memory storage devices of the data storage system 10. User interface 202 can be supported by interface component 21, which may comprise hardware and/or software. For example, interface component 21 can comprise a software application running on the computer-memory complex 30 or node controller 32 in a node 22. User interface 202 may provide a graphical user interface in some embodiments.

Figure 6:
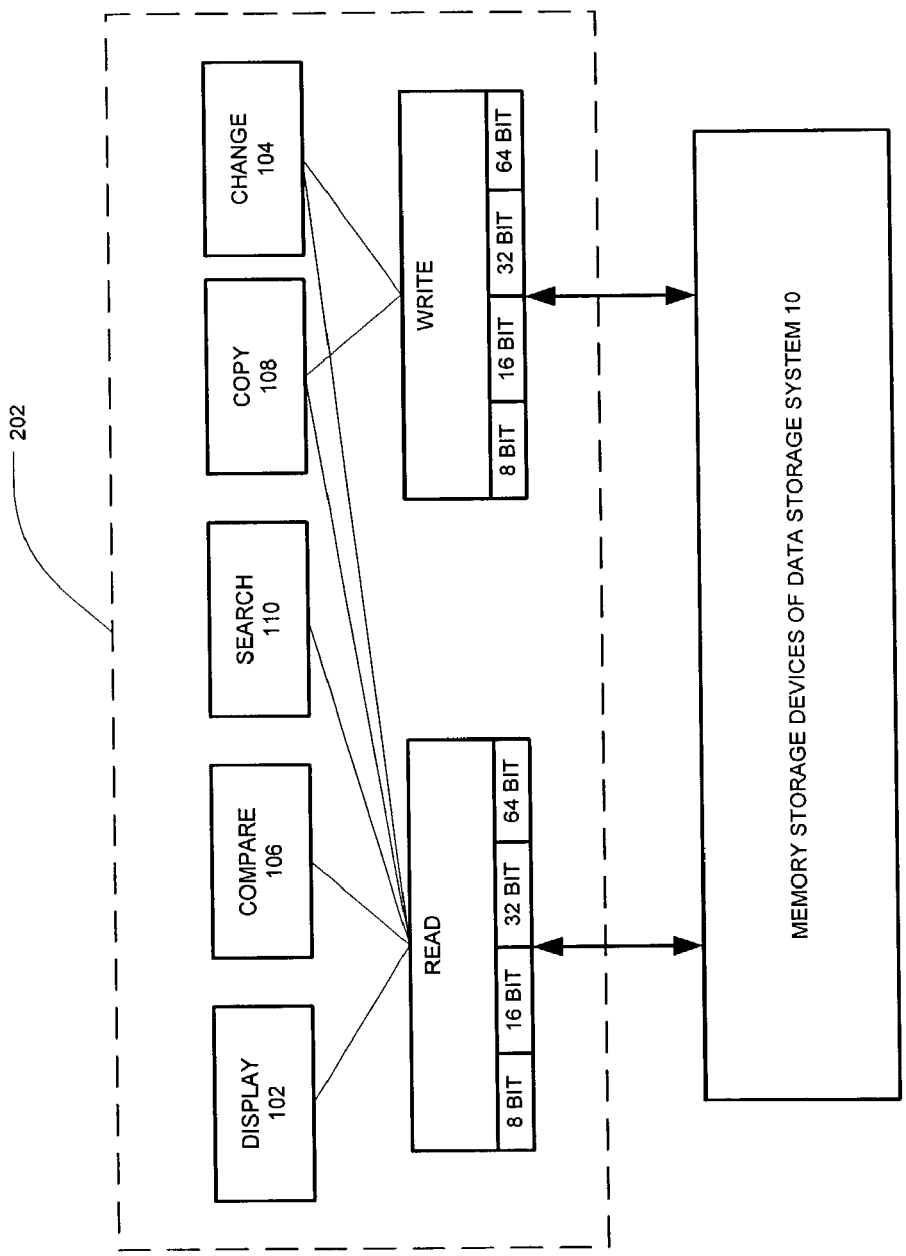
FIG. 6 illustrates an exemplary implementation for an interface for accessing the memory storage devices, according to an embodiment of the present invention.

User interface 202 seen in FIG. 6 allows a user to access the 8, 16, 32, 64 bit or other memory storage devices of data storage system 10 with a simple set of commands universally applicable for the various types and brands of storage devices. Essentially, the user interface 202 allows a user to read and write to and from the various memory storage devices/components of data storage system 10 and their associated firmware without knowing the syntax and structure of the commands of each different device. A user can select the display command 102, which will read an area of memory of a selected device and display the contents. The user may also select the change command 104 which reads an area of a memory storage device, changes the contents of the area, and then writes back the changed contents to the area. The compare command 106 reads two different areas of memory and compares them. Copy command 108 reads an area of a selected storage device, and copies it into another area of the same or different device. Search command 110 will scan a device or a particular area of a storage device for a specific set of characters or for a specific content.

In one embodiment, interface component 21, employed in support of user interface 202, may be implemented with one or more tables which can be used in correlating or converting any given user-entered universal command to commands, instructions, protocols, routines, or syntax that is specific for a storage device at which the universal command is directed.

Figure 7:
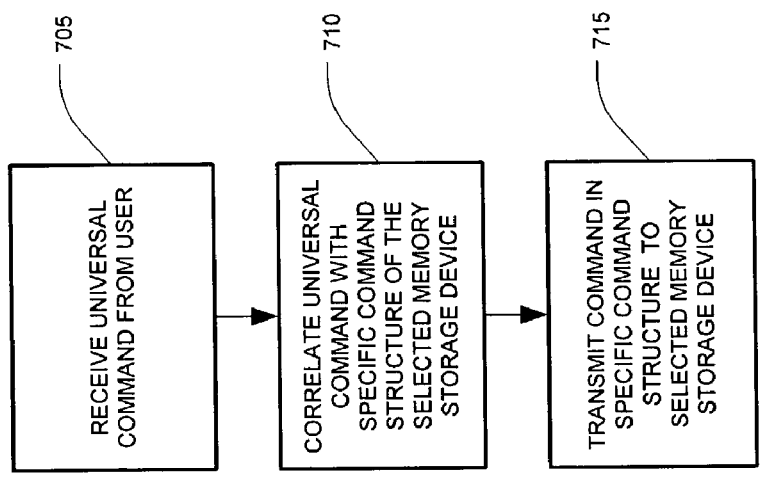
FIG. 7 is a flow chart that briefly describes the overall functionality of the interface and its associated routines.

FIG. 7 is a flow chart that briefly describes the overall functionality of the interface and its associated routines. Data storage system 10, and in particular user interface 202 and interface component 21 receive a universal command for a selected memory device from a user in step 705. The system then correlates the universal command received from the user with the specific command structure of the selected memory storage device of data storage system 10 in step 710. In step 715, a command formatted in the specific command structure of the selected memory storage device is transmitted to the selected memory storage device.

This interface is easily modifiable to include new types of storage devices and components as they become available. Thus, this interface and the method of accessing the memory storage devices it precipitates, should not be limited to the memory storage devices currently available on the market, such as those described above. What follows are tables of the five commands seen in FIG. 6 that illustrate the modifiers for the various commands and the syntax (command structure) of how the commands are structured.

TABLE 1

DISPLAY (dump) Command: d
dump [<modifiers>] [<address> [<size>]]

| Dump Modifiers | |
|---|---|
| da - Display without ASCII | db - Display bytes |
| ds - Display with byte swap | dw - Display words |
| dz - Set # of display bytes | dl - Display long words |
| d- - Display prior memory block | dq - Display quad words |
| do - Read device memory without displaying contents | dr - Display raw (no address or ASCII) |

| Dump Address Examples | |
|---|---|
| d 1234 | Display data at address 0x1234 |
| d . | Display last address |
| d .. | Display address at last data value |

| Dump Size Examples | |
|---|---|
| d 1234 100 | Display 0x100 bytes at address 0x1234 |
| d 1234 -100 | Display 0x100 bytes prior to address 0x1234 |

| Memory Spaces | |
|---|---|
| d eagle: 2000 | Display data starting at Eagle address 0x2000 |
| d flash: 70000 | Display flash starting at offset 0x70000 |
| d sram: 0 | Display SRAM starting at offset 0 |
| d i2c: m.t.a.o | Display I²C data at <mux>.<type>.<addr>[.<offset>] |
| d pci: b.d.f.a | Display PCI data at <bus>.<dev>.<func>[.<addr>] |
| d nvram: 0 | Display NVRAM battery backed data area in RTC |
| d io: 80 | Display CPU IO space starting at 0x80 |
| d prom: 0 | Display PROM area information starting at 0x0 |
| d ethprom: 0 | Display ethernet PROM area information at 0x0 |
| d vm1: c0000000 | Display virtual memory starting at 0xc0000000 |
| d ide: 200 | Display IDE drive data starting at sector 1 |
| d node0 40000000 | Display node in slot0 memory starting at 40000000 |
| d node4 io: 80 4 | Display node in slot4 CPU IO space at port 0x80 |

TABLE 2

CHANGE Command: c
change [<modifiers>] [<address> [<value>..] [len=<len>]]

| Change Modifiers: | |
|---|---|
| cb - Change byte | c . - Change at last address |
| cw - Change word | c .. - Change at last data value |
| cl - Change long word | cn - Change without displaying value |
| cq - Change quad word | cs - Change and swap bytes |

| Change at Address | |
|---|---|
| change 1234 | Change at address 0x1234 |
| change . | Change at last address |
| change .. | Change at address of last data value |

TABLE 2-continued

CHANGE Command: c
change [<modifiers>] [<address> [<value>..] [len=<len>]]

Change Value

| | |
|---|---|
| cb 1234 | Enter interactive change at address 0x1234 |
| cb 1234 ff | Write 0xff to address 0x1234 |
| cl 1234 ff | Write 0x000000ff to address 0x1234 |

Change Length

| | |
|---|---|
| cl 200 9876 len = 20 | Write 0x20 bytes of 0x00009876, start at addr 0x200 |
| cw 100 9876 len = 10 | Write 0x10 bytes of 0x9876, start at addr 0x100 |

TABLE 3

SEARCH Command: s
search [<modifiers>] <start> [[<end>] <value>]

Search Modifiers:

| | |
|---|---|
| sb - Search for byte | sl - Search for long word |
| sw - Search for word | sq - Search for quad word |
| ss - Search for swapped bytes | |

Search Start Address:

searchb 1234 ff - Find first 0xff starting at 0x1234

TABLE 4

COMPARE Command: mc
mem compare [<modifiers>] <addr1> <addr2> [<len>]

Compare Modifiers:

| | |
|---|---|
| mcb - Compare bytes | mcl - Compare long words |
| mcw - Compare words | mcq - Compare quad words |
| mcs - Byte swap compares | |

Compare Start Address:

mem compare 1 1000 2000 100 - Compare 0x100 bytes at 0x1000 with 0x2000

TABLE 5

COPY Command: mcopy
mem copy <saddr> <daddr> <len> - copy Pentium memory

<saddr> is the source address
<daddr> is the destination address
<len> is the transfer length

EXAMPLES ILLUSTRATING USAGE OF THE INVENTION

The following examples illustrate the use of the commands seen in FIG. 6 and in Tables 1-5 above.

Example 1

A lab engineer wants to observe the clock enable registers of a PCI bridge chip in the system. He first finds the device address by looking at the output of a PCI scan the BIOS showed while booting:

02.02.00 (0x80021000), PCI/PCI Bridge #0 (controls slot 1),

Vendor Digital, Device 0x0026, Rev 0x05,

Bridge device: PCI/PCI, Bus range [0x03 . . . 0x03].

The lab engineer then enters a command to display the registers of this PCI device using the dw (display words) modifier to display 70 words at the given address:

```
Whack> dw pci 2.2.0.0 70
pci 2.2.0.0000: 1011 0026 0147 0ab0 0005 0604 4010 0001  . G....@.

pci 2.2.0.0010: 0000 0000 0000 0000 0302 4403 01f1 22a0    ..D..."

pci 2.2.0.0020: fff0 0000 fff1 0001 0000 0000 0000 0000  ..  ...

pci 2.2.0.0030: 0000 0000 00dc 0000 0000 0000 0000 0823    . #.

pci 2.2.0.0040: 0000 0200 0000 0000 0000 0000 0000 0000    .

pci 2.2.0.0050: 0000 0000 0000 0000 0000 0000 0000 0000 pci 2.2.0.0060: 0000 0000 0000 f000 1ff0 0000 0000 0000       ...
```

The interface component 21 converts the universal command "dw" into one or more commands or instructions in the appropriate syntax for performing the desired access to the device. The PCI device receives the command or instruction that it recognizes and returns the data or information of interest to the lab engineer. The engineer knows the bridge clock register is at offset 0x68 on the device. And, for this particular type of device, the clock enable settings for this device are 0x1ff0.

Example 2

A software engineer is debugging a software problem and needs to view a section of memory attached to a specialized ASIC. The engineer enters a universal command using the dl (display long words) modifier to display 40 long words. The engineer already knows the physical memory address in the ASIC:

```
Whack> dl eagle 70100340 40
eagle 70100340:  41414140 00324141 5645bebf 0000000a  @AAAAA2 ..EV eagle 70100350:  00000001 0000028a 7c704502 00000008  .   ..  .Ep|.

eagle 70100360:  41414240 00324141 56d11a4c 0000000a  @BAAAA2 L..V eagle 70100370:  00000001 0000028b 8099de02 00001fc8  .   ..  ......
```

The interface component 21 converts the universal command "dl" into one or more commands or instructions in the appropriate syntax for performing the desired access to the device. The PCI device receives the command or instruction that it recognizes and returns the data or information of interest to the software engineer.

Example 3

A support engineer is helping a customer who has a problem with one node of the data storage system not booting correctly and notices the serial prom of the board specifies an incorrect type of the board. The BIOS is prohibiting entry on the console of the failing node. The engineer enters a universal command to change the serial prom of the remote node. In particular, the serial prom of another node in the cluster may be remotely accessed by using the cb (change byte) modifier:

Whack>cb node2 prom:6 node2 prom 0006: 03<

The interface component 21 converts the universal command "cb" into one or more commands or instructions in the appropriate syntax for performing the desired access to the device. The remote node's serial prom receives the command or instruction that it recognizes and returns the data or information of interest to the support engineer. It is known in advance the offset in the serial prom where the board revision is stored. The engineer enters the correct value (07) and terminates change mode entry:

```
node2  prom  0006:  03  <-  07
node2  prom  0007:  41  <-  .
```

The engineer then reboots the remote node and then uses the console of that node to finish the required fixes.

Thus while each of the computer hardware devices of a data storage cluster have different command structures and/or syntax, a user need only use one of the universal commands, such as shown in FIG. 6 and expounded upon in Tables 1-5, in order to access and modify the contents of the various computer hardware devices in the data storage cluster.

While embodiments of the present invention have been shown and described, changes and modifications to these illustrative embodiments can be made without departing from the present invention in its broader aspects. Thus it should be evident that there are other embodiments of this invention which, while not expressly described above, are within the scope of the present invention. Therefore, it will be understood that the appended claims necessarily encompass all such changes and modifications as fall within the described invention's true scope; and further that this scope is not limited merely to the illustrative embodiments presented to demonstrate that scope

The invention claimed is:

1. A method for an interface application to provide a user access to device registers in different types of computer hardware devices in a computer system for debugging the system, the method comprising:
   providing a set of universal commands for accessing the device registers in the computer hardware devices;
   receiving a first universal command entered by one or more users to access first data in first device registers of a first computer hardware device;
   translating the first universal command to read and write commands in a first command structure of the first computer hardware device;
   transmitting the read and write commands in the first command structure to the first computer hardware device over a first bus;
   receiving a second universal command entered by the one or more users to access second data in second device registers of a second computer hardware device, the second device registers having a different bit width size than the first device registers;
   translating the second universal command to read commands in a second command structure of the second computer hardware device, the first and the second command structures being different; and
   transmitting the read commands in the second command structure to the second computer hardware device over a second bus, the second bus being a different bus type than the first bus.

2. The method of claim 1 wherein the first and the second universal commands are selected from a group comprising at least one of display, change, search, compare and copy commands.

3. The method of claim 2 wherein the change command comprises reading contents of device registers of a computer hardware device, changing the contents, and writing the changed contents back to the device registers.

4. The method of claim 2 wherein the copy command comprises reading contents of device registers of a computer hardware device and copying the contents to other device registers of the same or another computer hardware device.

5. The method of claim 1 wherein the computer hardware devices comprise at least one or more of PCI devices, I²C devices, microprocessors, and application specific integrated circuits.

6. The method of claim 1 wherein the computer hardware devices are accessed over an I²C or PCI bus and protocol.

7. The method of claim 1 wherein the universal commands each comprises a base command and modifiers to the base command.

8. The method of claim 7 wherein the base command comprises address information and size information.

9. A computer system comprising:
   a first computer hardware device with first device registers, the first computer hardware device having a first command structure for accessing the first device registers;
   a second computer hardware device with second device registers, the second computer hardware device having a second command structure for accessing the second device registers, the first and the second command structures being different, the second device registers having a different bit width size than the first device registers;

an interface application for one or more users to debug the system, the interface application being configured to:

provide a user interface for receiving a set of universal commands for accessing the first and the second device registers;

receive first and second universal commands entered by the one or more users;

translate the first universal command to read and write commands in the first command structure of the first computer hardware device;

transmit the read and write commands in the first command structure to the first computer hardware device over a first bus;

translate the second universal command to read commands in the second command structure of the second computer hardware device; and transmit the read commands in the second command structure to the second computer hardware device over a second bus, the second bus being a different bus type than the first bus.

10. The system of claim 9 wherein the first and the second computer hardware devices are each selected from the group consisting of one or more PCI devices, I$^2$C devices, microprocessors, and application specific integrated circuits.

11. The system of claim 9 wherein the universal commands are configured to trigger reading and writing to and from device registers of computer hardware devices.

12. The system of claim 9 wherein the universal commands each comprises a base command and modifiers to the base command.

13. The method of claim 1, further comprising:

receiving the first data in the first device registers and displaying the first data to the one or more users; and receiving the second data in the second device registers and displaying the second data to the one or more users.

14. The system of claim 9, wherein the interface application is further configured to:

receive first data in the first device registers and displaying the first data to the one or more users; and receive second data in the second device registers and displaying the second data to the one or more users.

* * * * *